(12) United States Patent
Kuo (10) Patent No.: US 6,247,706 B1
(45) Date of Patent: Jun. 19, 2001

(54) SELF-LOCKING CHUCK (75) Inventor: Wen-chin Kuo, Ta Li (TW)

(73) Assignee: Chum Power Machinery Corp., Taichung Hsien (TW)

( * ) Notice: Subject to any disclaimer, the term of this patent is extended or adjusted under 35 U.S.C. 154(b) by 0 days.

(21) Appl. No.: 09/432,777

(22) Filed: Nov. 3, 1999

(51) Int. Cl.[7] .................................................. B23B 31/12
(52) U.S. Cl. .......................... 279/62; 279/140; 279/902
(58) Field of Search .............................. 279/60–62, 140, 279/150, 902

(56) References Cited

U.S. PATENT DOCUMENTS

| | | | |
|---|---|---|---|
| 4,951,955 | * | 8/1990 | Sakamaki ................................ 279/62 |
| 5,988,653 | * | 11/1999 | Kuo ......................................... 279/62 |
| 5,992,859 | * | 11/1999 | Lin .......................................... 279/62 |

* cited by examiner

Primary Examiner—Steven C. Bishop
(74) Attorney, Agent, or Firm—Bacon & Thomas, PLLC (57) ABSTRACT A self-locking chuck includes a body having one end for attachment onto a rotatable spindle and another end provided with a plurality of axially inclined jaw members having threaded surfaces formed on their outer sides for engagement with a threaded socket. Top and bottom cover shells are disposed, respectively over forward and rearward sections of the body, and a flexible thrust bearing ring assembly is disposed within the bottom cover shell. A spring and thrust bearing ring are disposed within the bottom cover shell for flexibly engaging the top cover shell and jaw members that move back and forth with the rotational force produced during use to grip or release a drill bit and permit adjustment of the engagement between the threaded socket and thrust bearing ring through manipulation of the top cover shell.

6 Claims, 7 Drawing Sheets

SELF-LOCKING CHUCK

BACKGROUND OF THE INVENTION

1. Field of the Invention

The present invention relates to a drill chuck for use with electric or pneumatic drivers and specifically relates to a chuck possessing a sleeve member which can be operated manually or is self-locking and increases the gripping force.

2. Description of the Prior Art

Figure 1:
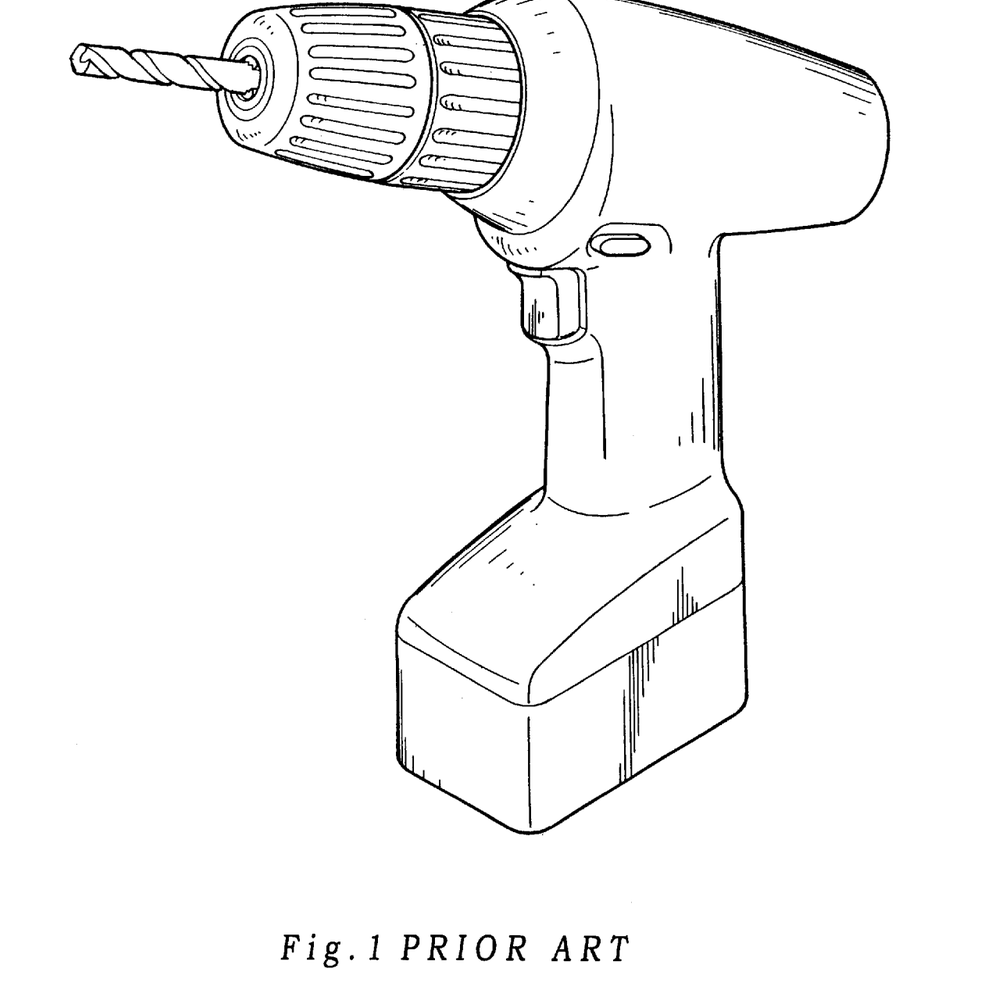
FIG. 1 is a three dimensional view of a chuck unit for a power drill according to the prior art.

A drill chuck of the prior art, as shown is FIG. 1, is chiefly comprised of body for receipt of a spindle, said body whose exterior having an adjustable cover shell and locking cover shell and said body having a plurality of jaw members disposed within the body member, where rotation of the adjustable cover shell controls the extension and retraction of the jaw members which grip or release the drill bit.

The user of a drill chuck of the prior art must rotate the adjustable cover shell with one hand while holding the drill bit inside the jaw members until the drill bit is locked in place. Not only is this awkward to handle, the limited surface available on adjustable cover shell often makes it difficult to determine whether or not enough gripping force has been applied between the drill bit and jaw members. If the gripping force around the drill bit is insufficient, the machine must be shut down and adjustable cover shell rotated by hand to tighten the drill bit. Besides being inconvenient, the adjustable cover shell and locking cover shell may still be in motion poising a risk of injury to the user.

SUMMARY OF THE INVENTION

In accordance with the present invention, there is provided an improved chuck possessing the following added value and effects:

It is the principal object of the present invention to achieve normal jaw clamping effect and self-locking function by manually gripping the top cover shell to actuate the thrust bearing ring and threaded socket by means of the shallow and deep recesses provided on the wear-resistant ring.

Another object of the present invention is to provide added safety by preventing the shell cover from rotating along with the spindle by mating the joint member with the driving device.

An additional object of the present invention is to loosen nuts through the forward and reverse action of the driving device by means of tight engagement of the body member and sleeve It is still a further object of the present invention to provide a means to manually tighten or loosen the gripping force on a drill through the use of a rod-shaped tool that is inserted into holes provided in the threaded socket in conjunction a wrench and sleeve where the force is applied to the rod-shaped tool and wrench in opposing directions Other objects, features and aspects of the present invention are discussed in greater detail below.

DETAILED DESCRIPTION OF THE PREFERRED EMBODIMENT

Figure 2:
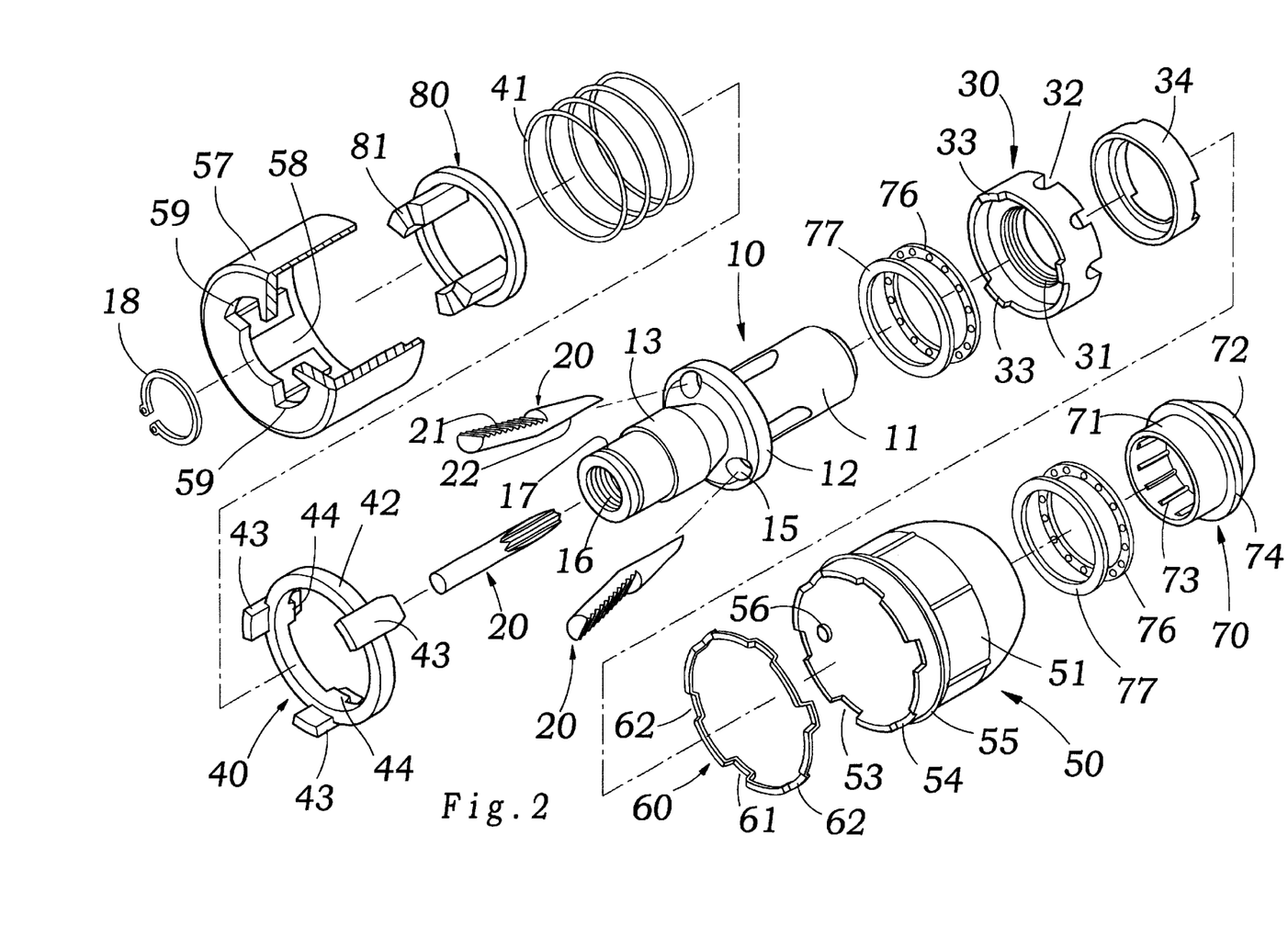
FIG. 2 is an exploded view of the chuck of the present invention.
Figure 3:
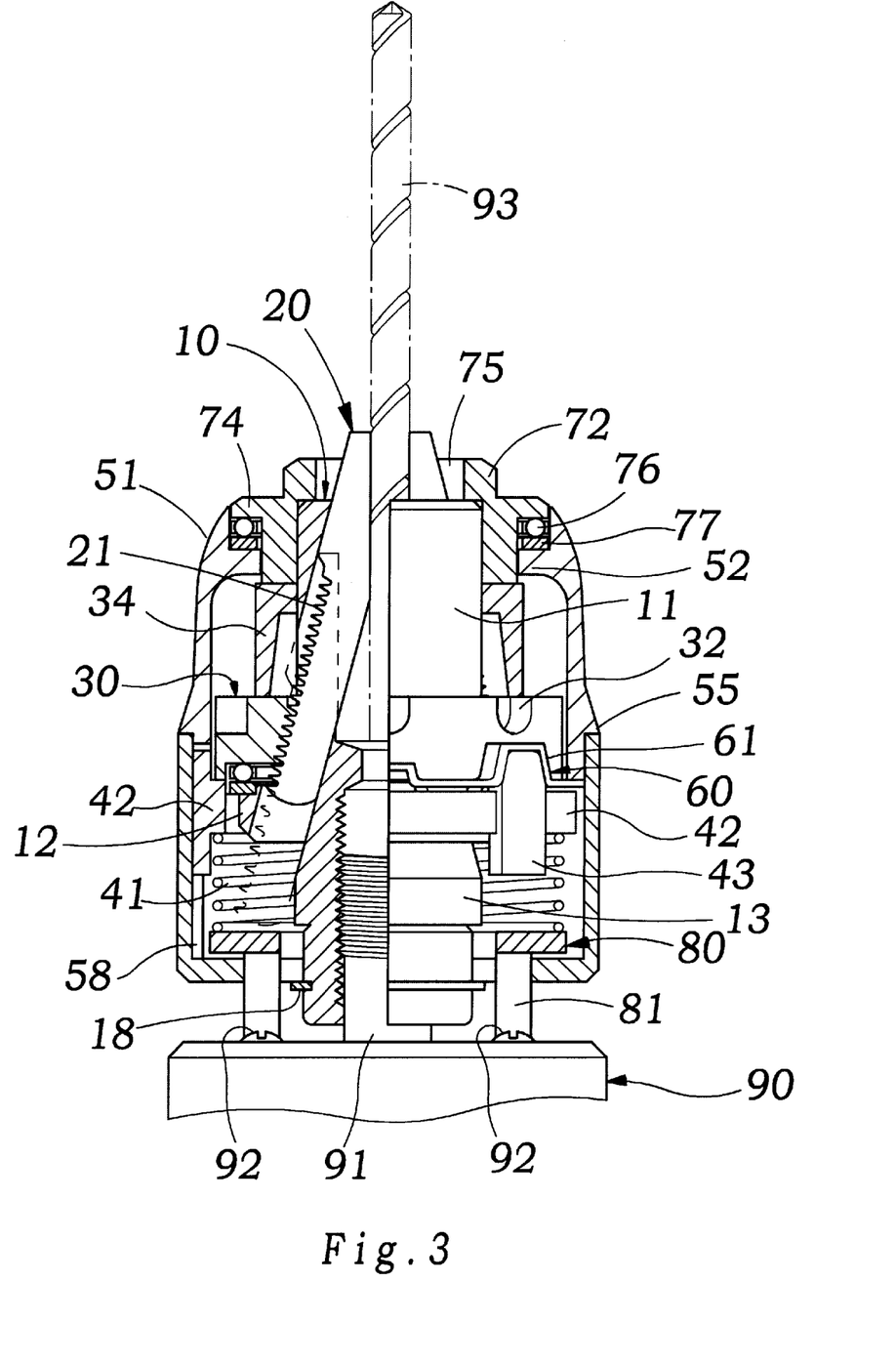
FIG. 3 is a cross-sectional view of the chuck according to the present invention.

Referring to FIGS. 2 and 3, a chuck includes:

A cylindrical body 10 comprised of a forward section 11, collar 12, and rearward section 13. The forward section 11 having center through-hole 14 formed within, the collar 12 having angularly disposed guide channels 15 intersecting center through-hole 14, and said rearward section 13 having a threaded hole 16 provided to mate with the spindle 91 of driving device 90, and a positioning groove 17 provided at its base.

A plurality of jaw members 20 positioned slideably in guide channels 15, each of which having a threaded surface 21 formed on the outer side and a gripping surface 22 on its forward inner surface.

A threaded socket 30 disposed about collar 12 of body 10, having a tapered screw threaded surface 31 formed on its internal surface in threaded engagement with threaded surfaces 21 of the jaw members, a plurality of recessed holes 32 formed on its surface, and a number of teeth 33 formed on the bottom.

A socket cover 34 axially mounted around the forward section 11 of body 10 to contact threaded socket 30.

A flexible thrust bearing ring assembly 40 comprised of a spring 41 and a thrust bearing ring 42 where the thrust bearing ring 42 is ring shaped and embossed with a plurality of toothlike members 43 with sloping sides around its periphery for mating with teeth 33 on threaded socket 30 and spring 41 inserted along the bottom edge of thrust bearing ring 42 to flexibly support thrust bearing ring 42.

A cover shell 50 composed of a top cover shell 51 and bottom cover shell 57. The bottom cover shell 57 having an opening in its top and bottom provided for insertion of forward section 11 of body 10, with locking ring 52 disposed about the inside wall of its top opening and alternating deep and shallow locking recesses 53, 54 to receive toothlike members 43 on thrust bearing ring 42 and having wedge shaped stops 55 formed along its outer edges. Covers over the top and bottom opening for covering rearward section 13 of body 10 and whose top opening may be engaged over the wedge shaped stops 55 on the top cover shell 51 to maintain the axial position of the bottom cover shell 57, whose inner surface is disposed with a plurality of vertically recessed channels 58 to slideably engage toothlike members 43 on thrust bearing ring 42, bottom opening provided for insertion of rearward section 13 and position member 18 disposed in positioning groove 17, also with fan shaped slots 59 formed on either sides of the lower opening provided for insertion of joint member 80.

A wear-resistant ring 60, made of wear resistant material, mounted at the lower opening of the top cover shell 51, having deep and shallow locking recesses 53, 54 disposed opposite the deep and shallow recessed ring 61, 62 provided for engagement and protection of top cover shell 51 and on both sides of the deep and shallow recesses 61, 62 are disposed with sloped toothlike members 43 that assist the top and bottom movement of the teeth as the wear-resistant ring 60 is rotated.

A sleeve 70 having a positioning member 71 and a sleeve member 72, positioning member 71 having cylindrical center through-hole and a plurality of positioning ridges 73 raised from the inner wall for engagement of the forward section 11 of body 10, a stop flange 74 raised around the outer wall that forms a rest surface with the locking ring 52 on the top cover shell 51 when the positioning member 71 is inserted into forward section 11 and a plurality of angular recesses 75 disposed inside sleeve member 72 provided for insertion of nut 94.

Two bearing assemblies comprised of a bearing ring 76 and washer 77 sandwiched together and individually inserted between the stop flange 74 and locking ring 52 and between the threaded socket 30 and collar 12 to allow smooth movement and reduce friction.

A joint member 80, having a ring shape, disposed between the spring 41 and bottom cover shell 57, whose bottom is attached with a plurality of joint pieces 81, the joint pieces 81 can be inserted through the fan shaped slots 59 joining with bolt 92 on driving device 90 and subject to the force from spring 41 and situated in contact with front end of driving device 90.

Now that the above construction is understood, below is provided a description of the operation of the present invention.

The present preferred embodiment of the invention is best illustrated by the foregoing description of a drill bit 93 being clamped by the chuck. Drill bit 93 is inserted between center through-hole 14 and gripping surface 22 of each jaw members 20. As spindle 91 rotates quickly in its operational direction, the center through-hole 14 and the jaw members 20 above rotate instantly. Through the action of the tapered threaded surface 31 of the threaded socket 30 with the threaded surface 21 of jaw members 20, the jaw members 20 instantly incline upwards causing the outer end of the jaw members 20 to gradually move toward their center point, clamp down on the drill bit 93 and increase the strength of the gripping surface 22 creating a stable grip. Jaw members 20 are not permitted to move further forward due to the presence of drill bit 93. Threaded surface 21 and the tapered threaded surface 31 of threaded socket 30 join in threaded engagement causing threaded socket 30 and body 10 to rotate simultaneously, top cover shell 51, bottom cover shell 57, spring 41 and thrust bearing ring 42 are joined together as one unit since joint member 80 is engaged to bolt 92 on driving device 90 and thus will not rotate along with spindle 91 providing added value and safety during use.

Figure 4:
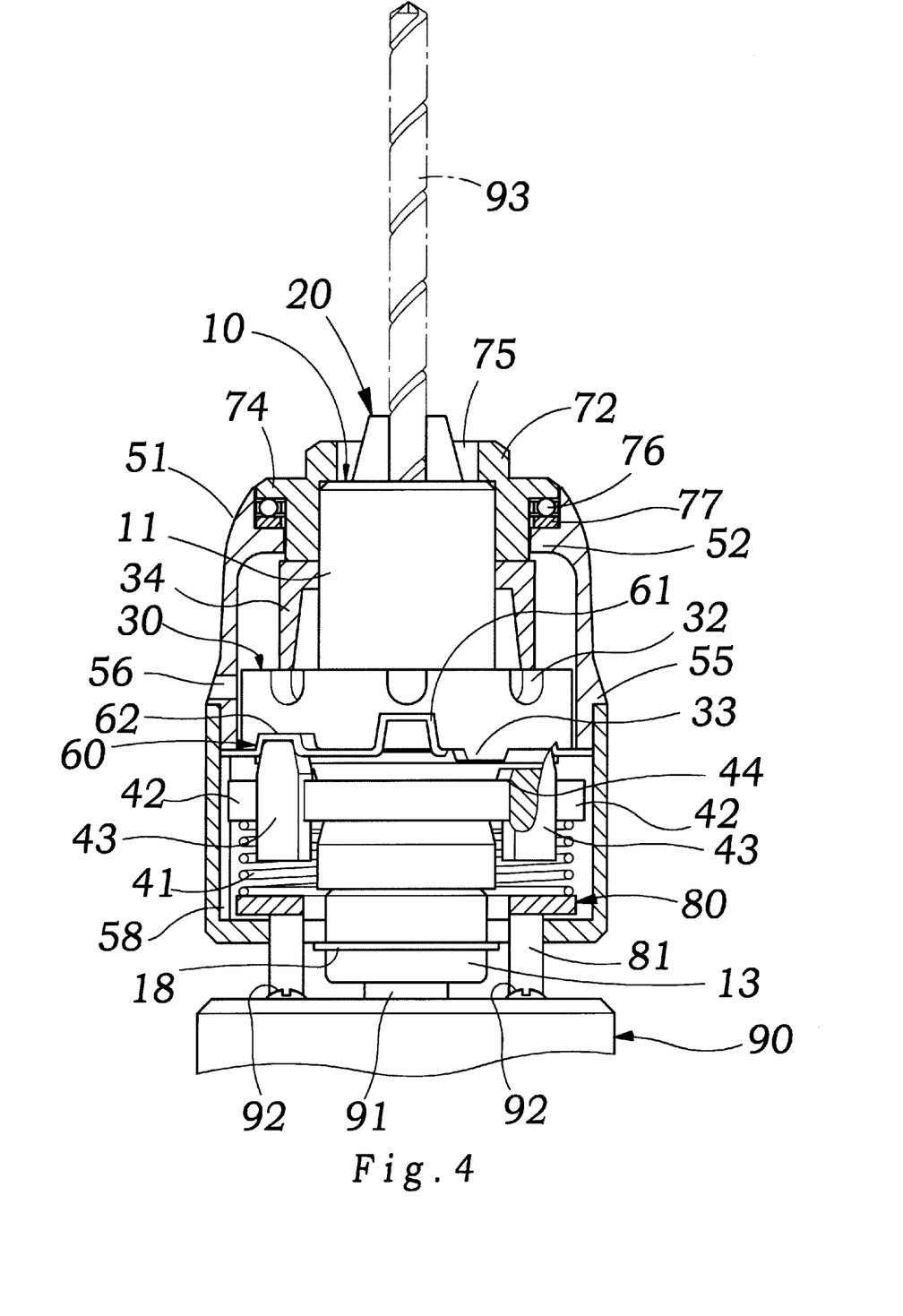
FIG. 4 is a cross-sectional view of the chuck in its normal operational mode according to the present invention.

FIG. 4 shows a schematic of the present invention in a normal operation mode. By applying force to the top cover shell 51, the user adjusts the rotational position and selects the position of engagement between the shallow recesses 62 on wear-resistant ring 60 and toothlike members 43. At this time, the thrust bearing ring 42 will be supported by the wear-resistant ring 60 and move downward, teeth 44 will disengage from teeth 33 on the threaded socket 30 causing the threaded socket 30 to be free of any contact while being rotated.

Figure 5:
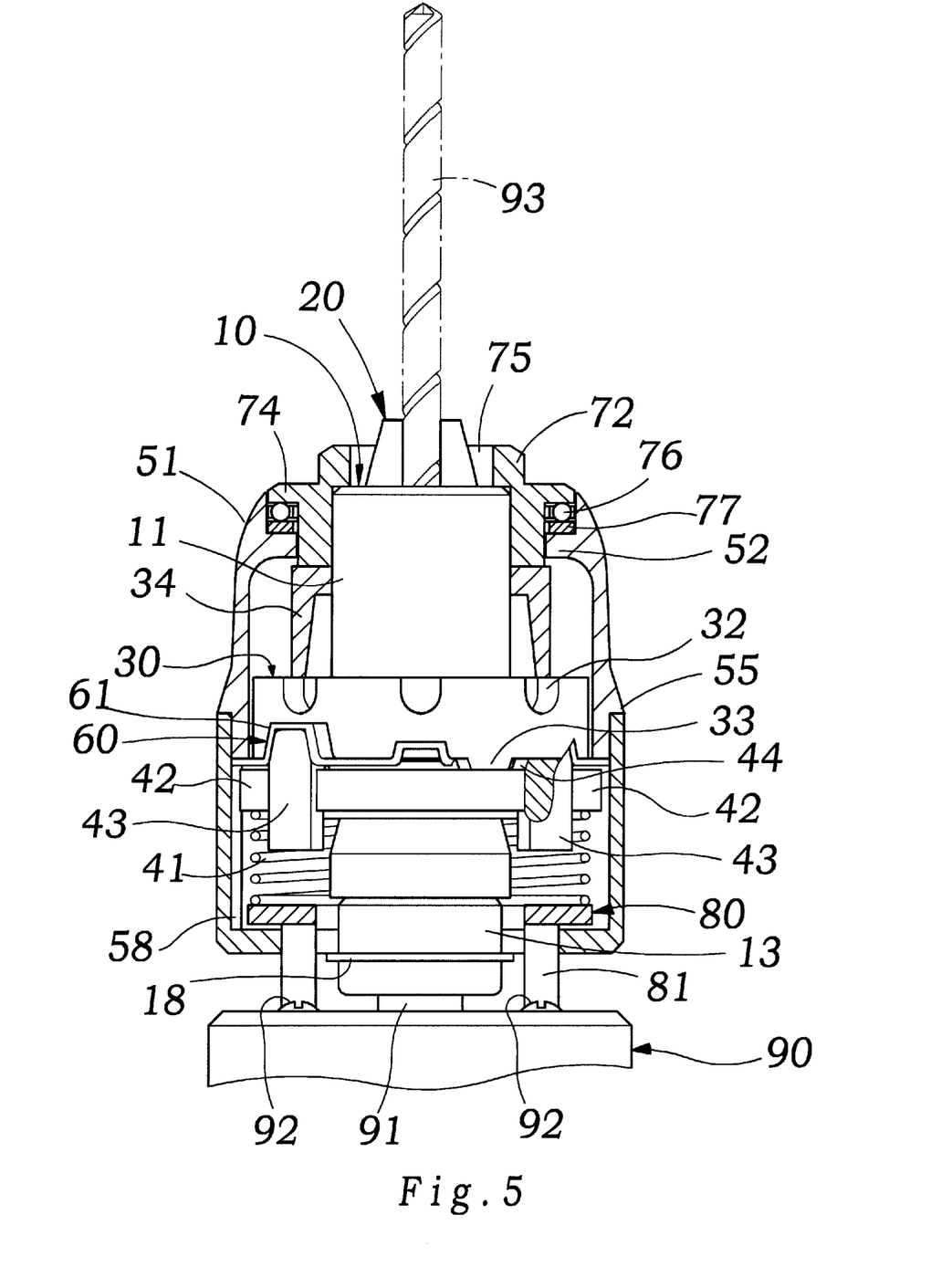
FIG. 5 is a cross-sectional view of the chuck in its thrust operational mode according to the present invention.

FIG. 5 shows a schematic of the present invention in thrust operation mode. When the drill bit 93 rotates in the operational direction during drilling and is subject to significant resistance or the gripping force around the drill bit 93 is insufficient, the top cover shell 51 may be turned during operation or rest so the wear-resistant ring 60 is rotated to the deep recess 61 without safety concerns since the upper shell does not rotate during operation.

At this time, the thrust bearing ring 42 will move upwards due the flex action of the spring 41 and the toothlike members 43 engage with deep recess 61 and teeth 44 will simultaneously mesh with teeth 44 on thrust bearing ring 42 and the rotationally positioned thrust bearing ring 42 move up and down in recessed channels 58 provided in bottom cover shell 57 to allow tighter engagement of the threaded surface 31 on threaded socket 30 and threaded surface 21 on jaw members 20, eliminating the gap existing between the threads and increasing the stability of the gripping force and the amount of torque exerted.

Figure 6:
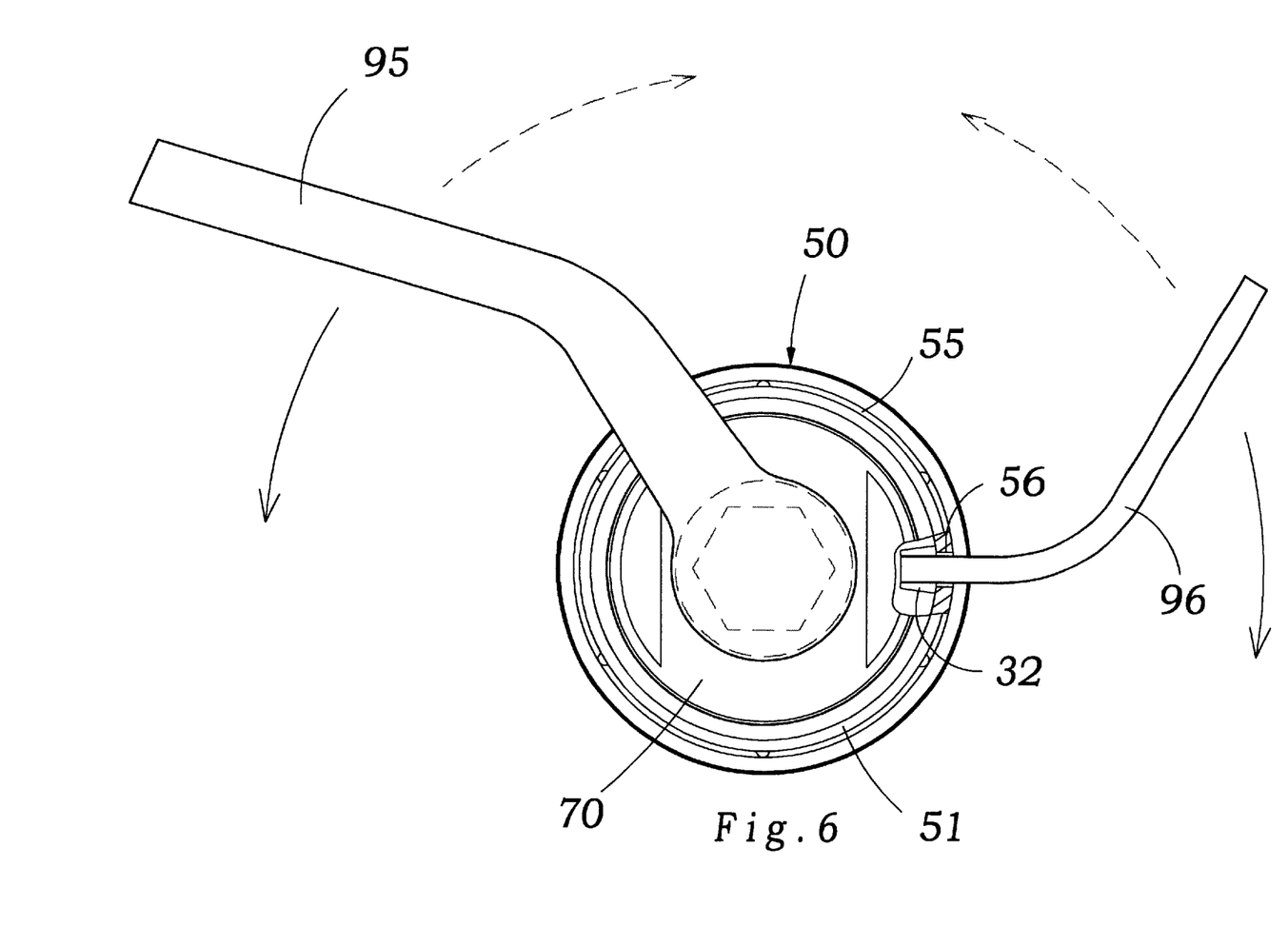
FIG. 6 is a schematic drawing of the chuck with rod-shaped tool and wrench according to the present invention.

FIG. 6 shows the position of hole 56 in top cover shell 51 disposed opposite the recessed hole 32 on threaded socket 30 provided for insertion of rod-shaped tool 96 into recessed hole 32 through hole 56 and by inserting wrench 95 over sleeve 70 and exerting force in an opposite direction to allow tighter engagement of the threaded surface 31 on threaded socket 30 and threaded surface 21 on jaw members 20 to achieve manually loosening or tightening of drill bit 93.

Figure 7:
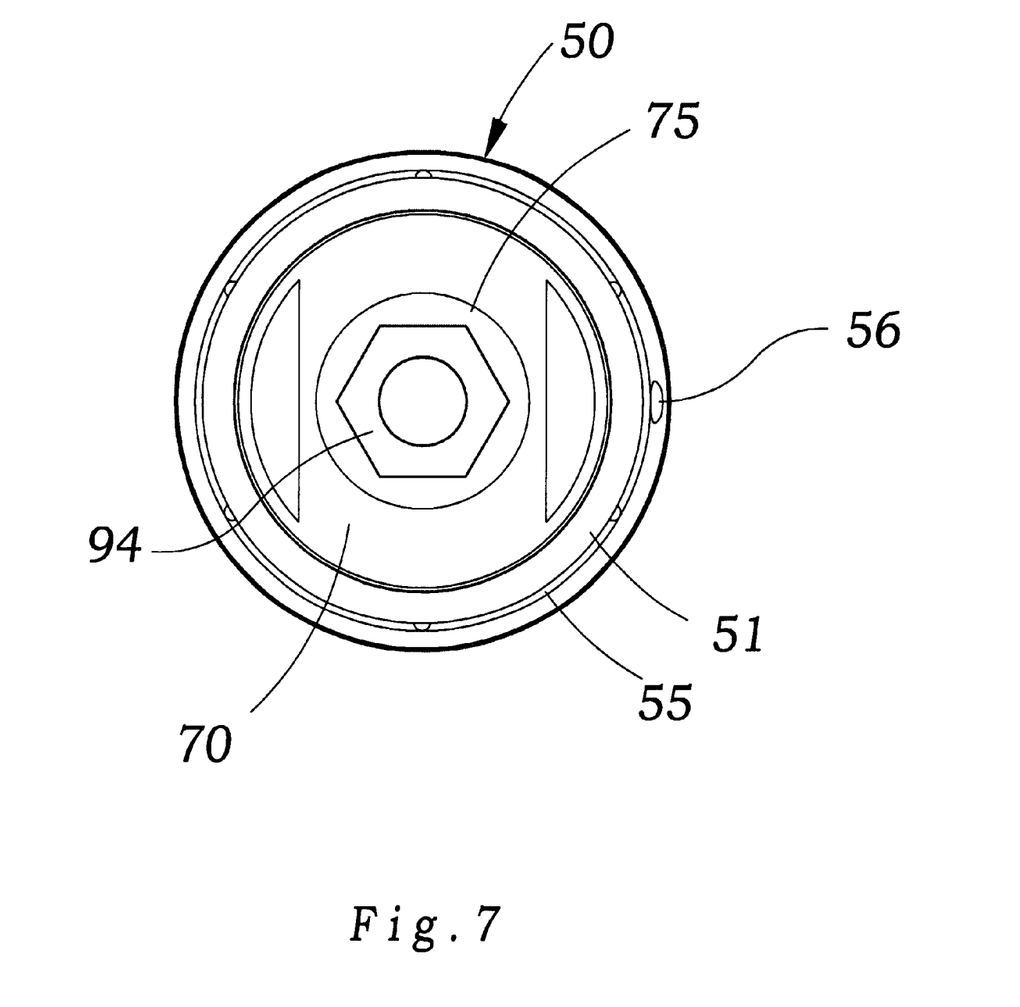
FIG. 7 is a schematic drawing of the present invention inserted over a nut.

And referring to FIG. 7 shows a plurality of angular recesses 75 disposed about the inner wall of sleeve 70 provided for insertion of nut 94 and allowing spindle 91 to turn and achieve loosening or tightening of nut 94.

What is claimed is:

1. A self-locking chuck for a rotational spindle, the chuck comprising:

a cylindrical body having a forward section, a collar and a rearward section, the forward section having a center hole formed therethrough, the collar being provided with a plurality of angularly disposed guide channels, and the rearward section being mountable on the spindle of a driving device;

a plurality of jaw members slidably disposed in the guide channels, each jaw member having a threaded surface formed on an outer side thereof;

a threaded socket disposed about the collar of the body in threaded engagement with the threaded surfaces of the jaw members, the threaded socket having a plurality of recessed holes and a plurality of teeth;

a socket cover axially mounted around the body to permit threaded engagement of the threaded socket and jaw members;

a top cover shell and a bottom cover shell covering the forward section and rearward section of the body;

a flexible thrust bearing ring assembly inserted in the bottom cover shell, the ring assembly including a spring and a thrust bearing ring for flexibly supporting the top cover shell, the thrust bearing ring being rotatable by the top cover shell for engaging the threaded socket;

a sleeve mounted on the forward portion of the body for axially positioning the top cover shell and socket cover;

two bearing assemblies inserted between the threaded socket and collar, and between the sleeve and upper cover shell;

a joint member inserted through the bottom cover shell and joined to the driving device for preventing the cover shell from rotating with the spindle during operation; and wherein by rotating the top cover shell, a user may manipulate the upper and lower axial positions of the thrust bearing ring by engaging the threaded socket and provide a chucking and self-locking function.

2. A self-locking chuck for a rotatable spindle, the chuck comprising:

a cylindrical body having a forward section, a collar and a rearward section, the forward section having a center hole formed therethrough, the collar being provided with a plurality of angularly disposed guide channels, and the rearward section being mountable on the spindle of a driving device;

a plurality of jaw members slidably disposed in the guide channels, each jaw member having a threaded surface formed on an outer side thereof;

a threaded socket disposed about the collar of the body in threaded engagement with the threaded surfaces of the jaw members;

a socket cover axially mounted around the body to permit threaded engagement of the threaded socket and jaw members;

a top cover shell and a bottom cover shell covering the forward section and rearward section of the body;

a flexible thrust bearing ring assembly inserted in the bottom cover shell, the ring assembly including a spring and a thrust bearing ring for flexibly supporting the top cover shell, the thrust bearing ring including a plurality of tooth-like members thereon and being rotatable by the top cover shell for engaging the threaded socket, the top cover shell having a plurality of alternating deep and shallow locking recesses for receiving the tooth-like members of the thrust bearing ring and a plurality of wedge-shaped stops formed around its outer edges for axially positioning the bottom cover shell;

a sleeve mounted on the forward section of the body for axially positioning the top cover shell and socket cover;

two bearing assemblies inserted between the threaded socket and collar, and between the sleeve and upper cover shell;

a joint member inserted through the bottom cover shell and joined to the driving device for preventing the cover shell from rotating with the spindle during operation; and wherein by rotating the top cover shell, a user may manipulate the upper and lower axial positions of the thrust bearing ring by engaging the threaded socket and provide a chucking and self-locking function.

3. The self-locking chuck of claim 2, wherein a wear-resistant ring is positioned opposite the deep and shallow locking recesses of the top cover shell.

4. A self-locking chuck for a rotatable spindle, the chuck comprising:

a cylindrical body having a forward section, a collar and a rearward section, the forward section having a center hole formed therethrough, the collar being provided with a plurality of angularly disposed guide channels, and the rearward section being mountable on the spindle of a driving device;

a plurality of jaw members slidably disposed in the guide channels, each jaw member having a threaded surface formed on an outer surface thereof;

a threaded socket disposed about the collar of the body in threaded engagement with the threaded surfaces of the jaw members;

a socket cover axially mounted around the body to permit threaded engagement of the threaded socket and jaw members;

a top cover shell and a bottom cover shell covering the forward section and rearward section of the body, the bottom cover shell including a lower opening formed with a plurality of fan-shaped slots;

a flexible thrust bearing ring assembly inserted in the bottom cover shell, the ring assembly including a spring and a thrust bearing ring for flexibly supporting the top cover shell, and the thrust bearing ring being rotatable by the top cover shell for engaging the threaded socket;

a sleeve mounted on the forward section of the body for axially positioning the top cover shell and socket cover;

two bearing assemblies inserted between the threaded socket and collar, and between the sleeve and upper cover shell;

a joint member inserted through the bottom cover shell and joined to the driving device for preventing the cover shell from rotating with the spindle during operation; and wherein by rotating the top cover shell, a user may manipulate the upper and lower axial positions of the thrust bearing ring by engaging the threaded socket and provide a chucking and self-locking function.

5. The self-locking chuck of claim 4, wherein the joint member is ring-shaped and is embossed with a plurality of joint pieces, the joint pieces being insertable through the fan-shaped slots to form a single unit with the driving device.

6. A self-locking chuck for a rotatable spindle, the chuck comprising:

a cylindrical body having a forward section, a collar and a rearward section, the forward section having a center hole formed therethrough, the collar being provided with a plurality of angularly disposed guide channels, and the rearward section being mountable on the spindle of a driving device;

a plurality of jaw members slidably disposed in the guide channels, each jaw member having a threaded surface formed on an outer side thereof;

a threaded socket disposed about the collar of the body in threaded engagement with the threaded surfaces of the jaw members;

a socket cover axially mounted around the body to permit threaded engagement of the threaded socket and jaw members;

a top cover shell and a bottom cover shell covering the forward section and rearward section of the body;

a flexible thrust bearing ring assembly inserted in the bottom cover shell, the ring assembly including a spring and a thrust bearing ring for flexibly supporting the top cover shell, and the thrust bearing ring being rotatable by the top cover shell for engaging the threaded socket;

a sleeve mounted on the forward section of the body for axially positioning the top cover shell and socket cover, the sleeve is provided with a plurality of angular recesses for loosening or tightening a nut or for engaging a wrench to produce a tight engagement between the threaded surfaces of the threaded socket and jaw members;

two bearing assemblies inserted between the threaded socket and collar, and between the sleeve and upper cover shell;

a joint member inserted through the bottom cover shell and joined to the driving device for preventing the cover shell from rotating with the spindle during operation; and wherein by rotating the top cover shell, a user may manipulate the upper and lower axial positions of the thrust bearing ring by engaging the threaded socket and provide a chucking and self-locking function.

* * * * *